(12) United States Patent
Zhao (10) Patent No.: US 11,120,248 B2
(45) Date of Patent: Sep. 14, 2021

(54) FINGERPRINT COLLECTION METHOD AND ELECTRONIC APPARATUS

(71) Applicant: Lenovo (Beijing) Co., Ltd., Beijing (CN)

(72) Inventor: Qian Zhao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/833,031

(22) Filed: Mar. 27, 2020

(65) Prior Publication Data

US 2020/0311381 A1 Oct. 1, 2020

(30) Foreign Application Priority Data

Mar. 29, 2019 (CN) .......................... 201910247224.5

(51) Int. Cl.
*G06K 9/00* (2006.01)

(52) U.S. Cl.
CPC ....... *G06K 9/00087* (2013.01); *G06K 9/0004* (2013.01); *G06K 9/00067* (2013.01)

(58) Field of Classification Search
CPC ............. G06K 9/00087; G06K 9/0004; G06K 9/00067; G06K 9/00912; G06K 9/00013; G06K 2009/0006
See application file for complete search history.

(56) References Cited

U.S. PATENT DOCUMENTS

| | | | | |
|---|---|---|---|---|
| 2016/0026840 A1* | 1/2016 | Li | ......................... | G06K 9/0002 348/77 |
| 2017/0344797 A1 | 11/2017 | Hsieh et al. | | |
| 2018/0082048 A1* | 3/2018 | Yang | ....................... | G06F 3/011 |
| 2020/0226404 A1* | 7/2020 | Wu | ....................... | G06K 9/0004 |

FOREIGN PATENT DOCUMENTS

| | | |
|---|---|---|
| CN | 1573796 A | 2/2005 |
| CN | 101794386 A | 8/2010 |
| CN | 104036177 A | 9/2014 |
| CN | 106485125 A | 3/2017 |
| CN | 109313522 A | 2/2019 |
| CN | 109313705 A | 2/2019 |
| CN | 109416738 A | 3/2019 |

* cited by examiner

*Primary Examiner* — Abhishek Sarma
(74) *Attorney, Agent, or Firm* — Anova Law Group, PLLC (57) ABSTRACT

A fingerprint collection method includes obtaining a historical effective section for fingerprint collection, determining a target effective section for performing a fingerprint collection operation based on the historical effective section, and generating an indication based on the target effective section. The historical effective section is a partial section of a fingerprint collection section, the fingerprint collection section corresponds to a display output section of a display screen, and the fingerprint collection section is smaller than or equal to the display output section. The target effective section and the historical effective section are different. The indication is displayed at a target display section of the display output section, and the target effective section corresponds to the target display section.

20 Claims, 2 Drawing Sheets

FINGERPRINT COLLECTION METHOD AND ELECTRONIC APPARATUS

CROSS-REFERENCE TO RELATED APPLICATION

This application claims priority to Chinese Patent Application No. 201910247224.5, filed on Mar. 29, 2019, the entire content of which is incorporated herein by reference.

TECHNICAL FIELD

The present disclosure relates to the fingerprint technology, more particularly, to a fingerprint collection method and electronic apparatus.

BACKGROUND

With the development of fingerprint collection technology, a common fingerprint recognition function on an electronic apparatus with a full screen, such as a mobile phone, has evolved to use under-display fingerprint recognition components. The under-display fingerprint recognition function captures user fingerprint images by using optical technology to perform fingerprint recognition.

However, when the under-display fingerprint technology is used, through a reflector deception method, remaining fingerprint traces at a display screen may be used to cause an under-display fingerprint scanner to act as if a fingerprint unlock is performed by the owner of the electronic apparatus. By using this deceiving method, a mobile phone can be unlocked in just a second, and this technical vulnerability is often referred to as "residue reuse." Therefore, such vulnerability causes serious security risks for the electronic apparatus.

SUMMARY

Embodiments of the present disclosure provide a fingerprint collection method including obtaining a historical effective section for fingerprint collection, determining a target effective section for performing a fingerprint collection operation based on the historical effective section, and generating an indication based on the target effective section. The historical effective section is a partial section of a fingerprint collection section, the fingerprint collection section corresponds to a display output section of a display screen, and the fingerprint collection section is smaller than or equal to the display output section. The target effective section and the historical effective section are different. The indication is displayed at a target display section of the display output section, and the target effective section corresponds to the target display section.

Embodiments of the present disclosure provide an electronic apparatus including a display screen, a fingerprint collection device, and a processor. The display screen includes a display output section. The fingerprint collection device is configured under the display screen of the fingerprint collection device. The fingerprint collection device includes a fingerprint collection section, which corresponds to the display output section and is smaller than or equal to the display output section. The processor is configured to obtain a historical effective section for fingerprint collection, determine a target effective section for performing a fingerprint collection operation based on the historical effective section, and generate an indication based on the target effective section. The historical effective section is a partial section of a fingerprint collection section. The target effective section and the historical effective section are different. The indication is displayed at a target display section of the display output section, and the target effective section corresponds to the target display section.

Embodiments of the present disclosure provide a computer-readable storage medium having stored therein a computer program that, when executed by a processor of an electronic apparatus, causes the electronic apparatus to perform a method of fingerprint collection. The method includes obtaining a historical effective section for fingerprint collection, determining a target effective section for performing a fingerprint collection operation based on the historical effective section, and generating an indication based on the target effective section. The historical effective section is a partial section of a fingerprint collection section, the fingerprint collection section corresponds to a display output section of a display screen, and the fingerprint collection section is smaller than or equal to the display output section. The target effective section and the historical effective section are different. The indication is displayed at a target display section of the display output section, and the target effective section corresponds to the target display section.

DETAILED DESCRIPTION OF THE EMBODIMENTS

To understand features and technology contents of the embodiments of the present disclosure in more detail, implementations of the embodiments of the present disclosure are described in detail with reference to the accompanying drawings. The drawings are merely for reference and are not used to limit the embodiments of the present disclosure.

Figure 1:
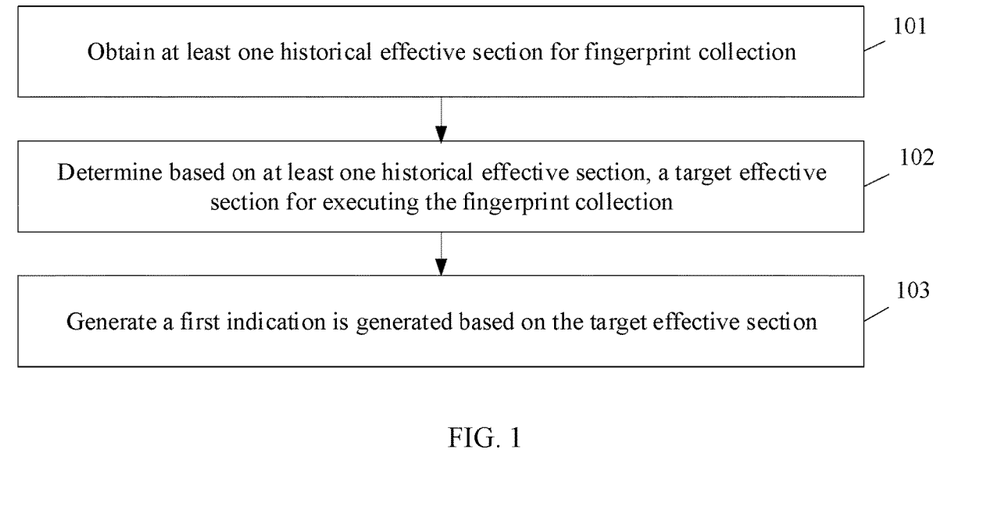
FIG. 1 is an illustrative flowchart of a fingerprint collection method according to the embodiments of the present disclosure.

In a first aspect, the embodiments of the present disclosure provide a fingerprint collection method applied to an electronic apparatus. As shown in FIG. 1, the fingerprint collection method includes following processes.

At Step 101, at least one historical effective section for fingerprint collection is obtained. The historical effective section is a partial section of an electronic apparatus fingerprint collection section. The fingerprint collection section corresponds to a display output section of a display screen, and the fingerprint collection section is smaller than or equal to the display output section.

At Step 102, based on at least one historical effective section, a target effective section for executing the fingerprint collection is determined. The target effective section and the historical effective section are at least partially different.

At Step 103, based on the target effective section, a first indication is generated. The first indication is used to indicate a guide content display at a target display section of the display output section, and the target effective section corresponds to the target display section.

A processor of an electronic apparatus may execute steps 101, 102, and 13. The electronic apparatus may be the electronic apparatus with an under-display fingerprint recognition function. The electronic apparatus includes a display screen, a fingerprint collection device, and a processor. The fingerprint collection device is located at the bottom surface side of the display screen. The top surface of the display screen is the display output section. A part or all of the display output section of the display screen is the fingerprint collection section, that is, the fingerprint collection device can collect fingerprint information from a part or all of the display output section.

In some embodiments of the present disclosure, the historical effective section is a section where fingerprint information is previously collected, when a fingerprint was successfully verified by the electronic apparatus.

The method further includes recording the historical effective section at least once before a present fingerprint collection and determining the target effective section that is at least partially different from the historical effective section. That is, an overlapping area of the historical effective section and the target effective section may be smaller than the minimum value of the historical effective section and the target effective section.

Figure 2:
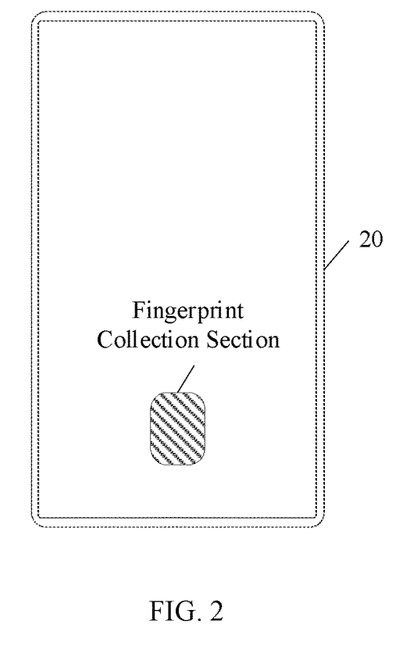
FIG. 2 is an illustrative diagram 1 of a fingerprint collection section according to the embodiments of the present disclosure.

In some embodiments, the electronic apparatus is a mobile phone with the under-display fingerprint recognition function. As shown in FIG. 2, in prior technology, a fingerprint collection section of the mobile phone 20 is at a place, where is near the bottom of the mobile phone display output section shown in a shaded area of the figure. This place matches with user habits when performing a fingerprint unlock, but the area of the fingerprint collection section can only be covered by one finger. Each time, the fingerprint collection is limited to this small area of the fingerprint collection section. Therefore, the problems related to residue reuse may easily appear.

The embodiments of the present disclosure provide specific implementation methods for the fingerprint collection method described above, which will be described separately with following examples.

In some embodiments, the process implementing step 101 may include at least one of obtaining a fingerprint input section determined by a touch sensing function of the display screen when a last fingerprint is successfully verified, obtaining a corresponding target display section when the last fingerprint is successfully verified, or obtaining a section corresponding to at least one image collection component executing an operation of the fingerprint collection of a fingerprint collection device when the last fingerprint is successfully verified.

The process implementing step 101 may further include obtaining the fingerprint input section determined by the touch sensing function of the display screen. When the last fingerprint is successfully verified, the process includes following operations. With the touch sensing function of the display screen, a user presses the display screen to perform a historical fingerprint collection operation, if a fingerprint recognition sensor is enabled, the fingerprint collection operation is effective. A touch area of the display screen is determined by using the touch sensing function of the display screen and is used as a historical effective section with a recorded touch position.

The process implementing step 101 may further include obtaining the corresponding target display section. When the last fingerprint is successfully verified, the process includes following operations. After the historical effective section is determined by using the fingerprint collection method provided by the embodiments of the present disclosure, the target display section of the display output section corresponding to the historical effective section is identified. A target effective section corresponding to the historical effective section is recorded at least once and is used to determine a target effective section of a present fingerprint collection.

Obtaining the section corresponding to the at least one image collection component executing the fingerprint collection operation of the fingerprint collection device, when the last fingerprint is successfully verified, includes following operations. The electronic apparatus further includes the fingerprint collection device configured to execute the fingerprint collection operation. The fingerprint collection device includes at least one image collection component configured to obtain a fingerprint image. The fingerprint image of the corresponding section is collected when the image collection component is working. The fingerprint image cannot be collected when the image collection component is closed. Therefore, when performing the fingerprint collection operation, the image collection component executing the fingerprint collection operation is recorded, that is, the image collection component is in working status. The display output section corresponding to the image collection component is an effective section for the fingerprint collection.

Figure 4:
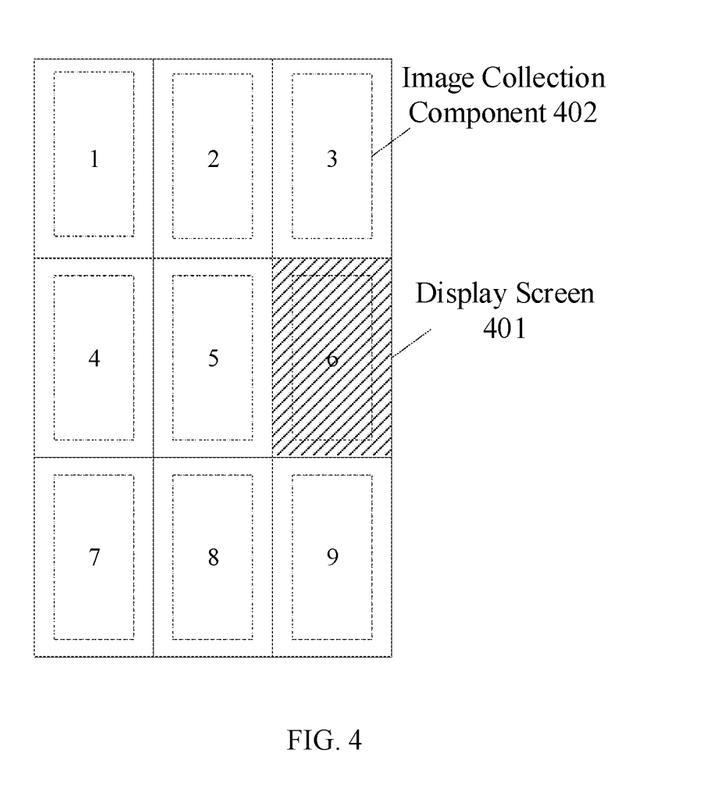
FIG. 4 is an illustrative diagram 3 of a fingerprint collection section according to the embodiments of the present disclosure.

As shown in FIG. 4, the electronic apparatus includes a display screen 401 and a fingerprint collection device consisted of nine image collection components 402. The nine image collection components are evenly distributed under the display screen 401, that is, the full display output section of the display screen is the fingerprint collection section. The display output section is evenly divided into nine sub-sections according to distributed positions of the image collection components, sub-section 1 to sub-section 9. Each image collection component corresponds to a sub-section. A part of the image collection components is controlled to be in working status when performing the fingerprint collection, and the other image collection components are in closed status. A shaded area in FIG. 4 means that the image collection component corresponding to the sub-section 6 is in working status and the other image collection components are in closed status, where the sub-section 6 is the effective section for the fingerprint collection.

In some embodiments, the image collection component may be a photosensitive component, which includes at least a transmitter for transmitting an optical signal and a receiver for receiving an optical signal. When fingers press the fingerprint collection section, the transmitter transmits the optical signal to the fingerprint collection section, the transmitted optical signal are reflected by a surface of the fingers to become a reflected optical signal, the receiver receives the reflected optical signal, and the reflected optical signal is detected to obtain the user fingerprint image.

In some embodiments, the process 102 may specifically include determining the first historical effective section from the at least one historical effective section, moving the first historical effective section along a first direction with a first distance and/or along a second direction with a second distance to obtain the target effective section.

In the embodiments, the first historical effective section may be an effective section performing a last fingerprint collection operation. Since earlier remaining user fingerprint traces at the display screen are destroyed by operations such as pressing, sliding, etc., executed by the user and cannot be reused, the residue reuse problem mostly reuses remaining fingerprints left at the display screen from an execution of a last successful fingerprint verification. Therefore, in various implementations, to simplify a processing procedure, only the last historical effective section can be focused on.

In some embodiments, the movement method of the first historical effective section may be moving the first historical effective section along X-axis with the first distance and along Y-axis with the second distance. An X-axis direction and a Y-axis direction may the axis directions of a 2-dimensional coordinate defined by the display screen. The first distance and the second distance may be movement distances determined according to a number of pixels.

In some embodiments, the first indication is used to indicate a center position of the target effective section and/or a boundary position of the target effective section. Since the target effective section corresponds to the target display section, the target display section may also be understood as the target effective section, and the indication is used to indicate a center position or boundary position of the target display section. A guide content displayed at the target display section may be a light indication or an image indication.

In some embodiments, after the process 103, the method further includes obtaining target fingerprint information collected from the target effective section and performing biometric verification to the target fingerprint information to obtain a verification result. If the verification result is that the target fingerprint information matches a preset fingerprint information, unlock processing is performed. If the verification result is that the target fingerprint information does not match the preset fingerprint information, the target fingerprint information is omitted, and the indication is generated to indicate an unsuccessful verification or indicate a re-execution of the fingerprint collection operation.

In some embodiments, after the process 103, the method further includes obtaining historical fingerprint information collected from the historical effective section and obtaining the target fingerprint information collected from the target effective section. If the target fingerprint information is at least partially different from the historical fingerprint information, the unlock processing is executed based on the target fingerprint information. If the target fingerprint information is the same as the historical fingerprint information, the target fingerprint information is not processed.

In some embodiments, the historical fingerprint information and the target fingerprint information at least include fingerprint textures, fingerprint orientations, and numbers of fingerprints. The target fingerprint information at least partially different from the historical fingerprint information includes that at least one of the fingerprint texture, the fingerprint orientation, or the number of fingerprints of the target fingerprint information is different from the fingerprint texture, the fingerprint direction, and the number of fingerprints of the historical fingerprint information. The target fingerprint information the same as the historical fingerprint information includes that the target fingerprint information has the same fingerprint texture, the same fingerprint orientation, and the same number of fingerprints as the historical fingerprint information.

In the embodiments, a purpose of obtaining the historical fingerprint information and the target fingerprint information is to compare if the target fingerprint information is the same as the historical fingerprint information. For example, with the completely same fingerprint textures and the completely same fingerprint orientations, since a probability that entry positions are completely coincident when a user normally performs a fingerprint entry is very small, if the present collected fingerprint information is completely the same as the historical fingerprint information, the residue reuse can be determined, the present fingerprint information is refused to be processed and is omitted.

In some embodiments, the method further includes obtaining the historical fingerprint information from the historical effective section. The historical fingerprint information at least includes a first fingerprint number. A second fingerprint number of the target effective section is determined based on the first fingerprint number of the historical effective section. The first fingerprint number is different from the second fingerprint number. A second indication is generated based on the second fingerprint number. The second indication is used to indicate the user of a number of fingers to perform the fingerprint collection.

In some embodiments, the effective section of the fingerprint collection can collect fingerprint information of at least one finger. Only the fingerprint information of all the fingers are successfully verified, the fingerprint verification is determined to be successful. To avoid reusing the remaining fingerprint traces of the historical effective section, the second fingerprint number collected from the target effective section may be different from the first fingerprint number collected from the historical effective section. For example, the first fingerprint number is 1, and the second fingerprint number is 2, 3, or 4. The first fingerprint number is 3, and the second fingerprint number is 1 or 2.

In the embodiments, the second indication may be an image indication or a voice indication.

In some embodiments, the method further includes obtaining the historical fingerprint information collected from the historical effective section. The historical fingerprint information at least includes an object of the first fingerprint. An object of the second fingerprint of the target effective section is determined based on the object of the first fingerprint of the historical effective section. The object of the first fingerprint and the object of the second fingerprint may be different. A third indication may be generated based on the object of the second fingerprint. The third indication is used to indicate the user of fingers to perform the fingerprint collection.

In the embodiments, a fingerprint object indicates different fingers including a left hand, a right hand, a left foot, a right foot, a thumb, a point finger, a middle finger, a ring finger, and a little finger. In other words, the effective section for the fingerprint collection can collect the fingerprint information of the different fingerprint objects. To avoid reusing the remaining fingerprint traces of the historical effective section, the object of the second fingerprint collected from the target effective section can be different from the object of the first fingerprint collected from the historical effective section. For example, the object of the first fingerprint is a point finger of a right hand, and the object of the second fingerprint is a thumb of a right hand. The object of the first fingerprint is a point finger of a right hand and a thumb of a right hand, and the object of the second fingerprint is a middle finger of a right hand.

In the embodiments, the third indication may be an image indication or a voice indication.

By using the technical solution described above, when the fingerprint information is collected for a biometric verification, the historical effective section is a partial section of the fingerprint collection section, and the biometric verification is successfully performed to the fingerprint information collected from the historical effective section. To avoid reusing the remaining fingerprint traces of the historical effective section, the target effective section cannot be completely the same as the historical effective section. Based on this principle, the target effective section is determined, and the first indication is generated to indicate the target effective section to guide the user of a pressing position for the fingerprint collection. In this way, the remaining fingerprint traces of the historical effective section are impossible to be completely collected from the target effective section, such that the problem of residue reuse is solved.

Figure 5:
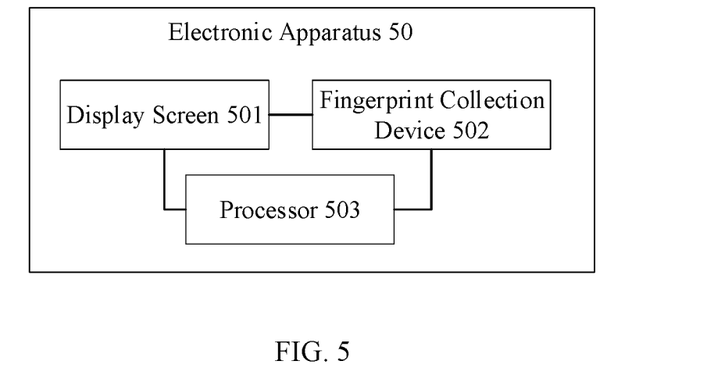
FIG. 5 is an illustrative structural diagram of an electronic apparatus according to the embodiments of the present disclosure.

In a second aspect, the embodiments of the present disclosure provide an electronic apparatus based on the same invention concepts. As shown in FIG. 5, the electronic apparatus 50 includes a display screen 501, a fingerprint collection device 502, and a processor 503.

The display screen 501 includes a display output section.

The fingerprint collection device 502 is configured under the display screen and includes a fingerprint collection section. The fingerprint collection section corresponds to the display output section. The fingerprint collection section is smaller than or equal to the display output section.

The processor 503 is configured to obtain at least one historical effective section for fingerprint collection. The historical effective section is a partial section of the fingerprint collection section. A target effective section for executing a fingerprint collection operation is determined based on the at least one the historical effective section. The target effective section and the historical effective section are at least partially different. A first indication is generated based on the target effective section. The first indication is used to indicate a guide content displayed at a target display section of the display output section. The target effective section corresponds to the target display section.

In these embodiments, the components described above are coupled together through a bus system. The bus system is configured to realize connection and communication between the components. The bus system includes except data bus, also power bus, control bus, status signal bus, etc.

In these embodiments, the electronic apparatus may be the electronic apparatus capable of an under-display fingerprint recognition function. The fingerprint collection device is located at the bottom side of the display screen, and the top surface of the display screen is the display output section. A part of or all the display output section of the display screen is the fingerprint collection section, that is, the fingerprint collection device can collect the fingerprint information from a part of or all the display output section.

The historical effective section is the section used for the previous fingerprint information collection when the electronic apparatus successfully performs a fingerprint versification. The processor is further configured to record the historical effective section at least once, and before the present fingerprint collection, determine the target effective section at least partially different from the historical effective section, that is, an overlapping area of the historical effective section and the target effective section is smaller than the minimum value of the historical effective section and the target effective section.

The electronic apparatus may be a mobile phone capable of the under-display fingerprint recognition function. As shown in FIG. 2, in prior technology, the fingerprint collection section of the mobile phone 20 is at a place where is near the bottom of the mobile phone display output section shown in a shaded area of the figure. This place matches with user habits when performing a fingerprint unlock, but the area of the fingerprint collection section can only be covered by one finger. Each time, the fingerprint collection is limited to this small area of the fingerprint collection section. Therefore, the problem of residue reuse may easily happen.

Figure 3:
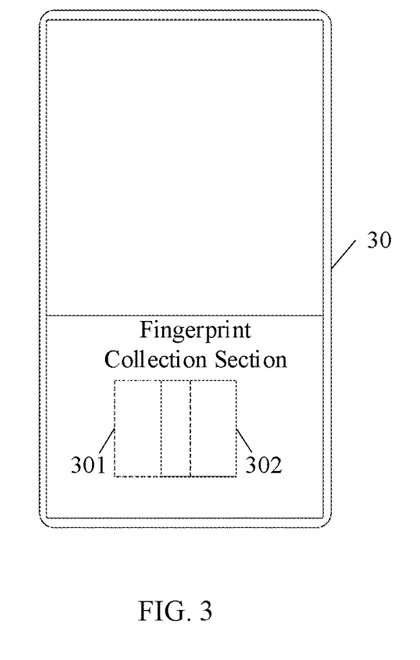
FIG. 3 is an illustrative diagram 2 of a fingerprint collection section according to the embodiments of the present disclosure.

As shown in FIG. 3, in the embodiments of the present disclosure, the area of the fingerprint collection section is enlarged. A fingerprint collection section of a mobile phone 30 is a bottom half section of the display output section. The historical effective section 301 surrounded by a dashed frame is a section where a fingerprint collection is performed, when a last fingerprint is successfully versified. The target effective section 302 surrounded by a solid frame is displaced from the historical effective section 301. The fingerprint collection section may further be the whole display output section.

The embodiments of the present disclosure further provide specific implementation functions for the components of the above-described electronic apparatus, which are described with examples as follows.

In some embodiments, the processor is configured to obtain at least one of the historical effective sections of the fingerprint collection including one of to obtain a section. When the last fingerprint is successfully verified, through a touch sensing function of the display screen, the processor may obtain a corresponding target display section when the last fingerprint is successfully verified, or obtain a section corresponding to at least one image collection component executing the fingerprint collection operation of the fingerprint collection device when the last fingerprint is successfully verified.

Obtaining the fingerprint input section determined by the touch sensing function of the display screen when the last fingerprint is successfully verified, may include the following operations. With the touch sensing function of the display screen, a user may press the display screen to perform a historical fingerprint collection operation. If a fingerprint recognition sensor is enabled, the fingerprint collection operation is effective. A touch area of the display screen is determined by using the touch sensing function of the display screen and is used as the historical effective section with a recorded touch position.

Obtaining the corresponding target display section when the last fingerprint is successfully verified, may include the following operations. After the historical effective section is determined by using the fingerprint collection method provided by the embodiments of the present disclosure, a target display section of the display output section corresponding to the historical effective section is identified. The target effective section corresponding to the historical effective section is recorded at least once and is used to determine the target effective section of the present fingerprint collection.

Obtaining the section corresponding to the at least one image collection component executing the fingerprint collection operation of the fingerprint collection device, when the last fingerprint is successfully verified may include the following operations. The electronic apparatus may further include the fingerprint collection device configured to execute the fingerprint collection operation. The fingerprint collection device may include at least one image collection component configured to obtain the fingerprint image. The fingerprint image of the corresponding section is collected when the image collection component is working. The fingerprint image cannot be collected when the image collection component is closed. Therefore, when performing the fingerprint collection operation, the image collection component executing the fingerprint collection operation is recorded, that is, the image collection component is in working status. The display output section corresponding to the image collection component is the effective section for the fingerprint collection.

As shown in FIG. 4, an electronic apparatus includes a display screen 401 and a fingerprint collection device consisted of nine image collection components 402. The nine image collection components are evenly distributed under the display screen 401, that is, the whole display output section of the display screen is the fingerprint collection section. The display output section is evenly divided into nine sub-sections according to distributed positions of the image collection components, sub-section 1 to sub-section 9. Each image collection component corresponds to a sub-section. A part of the image collection components is controlled to be in working status when performing the fingerprint collection, and the other image collection components are in closed status. A shaded area in FIG. 4 means that the image collection component corresponding to the sub-section 6 is in working status and the other image collection components are in closed status, where the sub-section 6 is the effective section for the fingerprint collection.

In some embodiments, the image collection component may be a photosensitive component, which includes at least a transmitter for transmitting an optical signal and a receiver for receiving an optical signal. When fingers press the fingerprint collection section, the transmitter transmits the optical signal to the fingerprint collection section, the transmitted optical signal are reflected by a surface of the fingers to become a reflected optical signal, the receiver receives the reflected optical signal, and the reflected optical signal is detected to obtain the user fingerprint image.

In some embodiments, the processor is configured to determine a first historical effective section from at least one the historical effective section, move the first historical effective section along a first direction with a first distance, and/or along a second direction with a second distance to obtain the target effective section.

In the embodiments, the first historical effective section may be an effective section performing the last fingerprint collection operation. Since the earlier remaining user fingerprint traces at the display screen are destroyed by operations such as pressing, sliding, etc., executed by the user and cannot be reused, the residue reuse problem mostly reuses the remaining fingerprints at the display screen from an execution of the last successful fingerprint verification. Therefore, in various implementations, to simplify a processing procedure, only the last historical effective section can be focused on.

In some embodiments, the first effective section may be moved along X-axis with the first distance and along Y-axis with the second distance. An X-axis direction and a Y-axis direction may be the axis directions of a 2-dimensional coordinate defined by the display screen. The first distance and the second distance may be movement distances determined according to a number of pixels.

In some embodiments, the first indication may be used to indicate a center position of the target effective section and/or a boundary position of the target effective section. Since the target effective section corresponds to the target display section, the target display section may also be understood as the target effective section, and the indication is used to indicate a center position or boundary position of the target display section. A guide content displayed at the target display section may be a light indication or an image indication.

In some embodiments, after the target effective section is determined, the processor is further configured to obtain target fingerprint information collected from the target effective section and perform biometric verification to the target fingerprint information to obtain a verification result. If the verification result is that the target fingerprint information matches a preset fingerprint information, unlock processing is performed. If the verification result is that the target fingerprint information does not match the preset fingerprint information, the target fingerprint information is omitted, and the indication is generated to indicate an unsuccessful verification or indicate a re-execution of the fingerprint collection operation.

In some embodiments, the processor is further configured to obtain historical fingerprint information collected from the historical effective section and obtain target fingerprint information collected from the target effective section. If the target fingerprint information is at least partially different from the historical fingerprint information, the unlock processing is executed based on the target fingerprint information. If the target information is the same as the historical fingerprint information, the target fingerprint information is not processed.

In some embodiments, the historical fingerprint information and the target fingerprint information at least include fingerprint textures, fingerprint orientations, and numbers of fingerprints. The target fingerprint information at least partially different from the historical fingerprint information includes that at least one of the fingerprint texture, the fingerprint direction, or the number of fingerprints of the target fingerprint information is different from the fingerprint texture, the fingerprint direction, and the number of fingerprints of the historical fingerprint information. The target fingerprint information the same as the historical fingerprint information includes that the target fingerprint information has the same fingerprint texture, the same fingerprint orientation, and the same number of fingerprints as the historical fingerprint information.

In the embodiments, the purpose of obtaining the historical fingerprint information and the target fingerprint information is to compare if the target fingerprint information is the same as the historical fingerprint information. For example, with the completely same fingerprint textures and the completely same fingerprint orientations, since a probability that entry positions are completely coincident, when a user normally performs a fingerprint entry, is very small, therefore, the probability that the fingerprint information normally collected twice from the fingerprint collection section is coincident is also very small, if the present collected fingerprint information is completely the same as the historical fingerprint information, the residue reuse can be determined, the present fingerprint information is refused to be processed and is omitted.

In some embodiments, the processor is further configured to obtain the historical fingerprint information from the historical effective section. The historical fingerprint information at least includes a first fingerprint number. A second fingerprint number of the target effective section is determined based on the first fingerprint number of the historical effective section. The first fingerprint number is different from the second fingerprint number. A second indication is generated based on the second fingerprint number. The second indication is used to indicate the user of a number of fingers to perform the fingerprint collection.

In some embodiments, the effective section of the fingerprint collection can collect the fingerprint information of at least one finger. Only the fingerprint information of all the fingers are successfully verified, the fingerprint verification is determined to be successful. To avoid reusing the remaining fingerprint traces of the historical effective section, the second fingerprint number collected from the target effective section may be different from the first fingerprint number collected from the historical effective section. For example, the first fingerprint number is 1, and the second fingerprint number is 2, 3, or 4. The first fingerprint number is 3, and the second fingerprint number is 1 or 2.

In these embodiments, the second indication may be an image indication or a voice indication.

In some embodiments, the processor is further configured to obtain the historical fingerprint information collected from the historical effective section. The historical fingerprint information at least includes an object of the first fingerprint. An object of the second fingerprint of the target effective section is determined based on the object of the first fingerprint of the historical effective section. The object of the first fingerprint and the object of the second fingerprint are different. A third indication is generated based on the object of the second fingerprint. The third indication is used to indicate the user of fingers to perform the fingerprint collection.

In these embodiments, a fingerprint object indicates different fingers including a left hand, a right hand, a left foot, a right foot, a thumb, a point finger, a middle finger, a ring finger, and a little finger. In other words, the effective section for the fingerprint collection can collect the fingerprint information of the different fingerprint objects. To avoid reusing the remaining fingerprint traces of the historical effective section, the object of the second fingerprint collected from the target effective section can be different from the object of the first fingerprint collected from the historical effective section. For example, the object of the first fingerprint is a point finger of a right hand, and the object of the second fingerprint is a thumb of a right hand. The object of the first fingerprint is a point finger of a right hand and a thumb of a right hand, and the object of the second fingerprint is a middle finger of a right hand.

In these embodiments, the third indication may be an image indication or a voice indication.

In some embodiments, the above-mentioned processor may be at least one of an application specific integrated circuit (ASIC), a digital signal processing device (DSPD), a programmable logic device (PLD), a field-programmable gate array (FPGA), a controller, a microcontroller, or a micro-processor. For different equipment, other electronic apparatus can be configured to implement the above-mentioned processing functions, which are not defined by the embodiments of the present disclosure.

By using the above-mentioned technical solution, when the fingerprint information is collected to perform a biometric verification, the historical effective section is a partial section of the fingerprint collection section, and the fingerprint information collected from the historical effective section is successfully verified. To avoid reusing the remaining fingerprint traces of the historical effective section, the target effective section cannot be completely the same as the historical effective section. The target effective section is determined based on this principle, the first indication is generated to indicate the target effective section to guide the user of the pressing position for the fingerprint collection, and the problem of residue reuse can be solved.

In the exemplary embodiments, a computer-readable storage medium, storing a computer program, is provided by the embodiments of the present disclosure. The computer program is executed by the processor to implement the processes of the previously mentioned method. The computer program is stored in memory, and the above-mentioned computer program can be executed by the processor 503 to complete the previously mentioned method processes.

Those skilled in the art should understand that the embodiments of the present disclosure can be provided as a method, a system, or a computer program product. Therefore, the present disclosure can be formed by hardware embodiments, software embodiments, or combinations of hardware embodiments and software embodiments. The present disclosure can be in form of a computer program product implemented with one or more computer-readable storage media (include but not limited to magnetic disk storage, optical storage, etc.) containing computer usable program codes.

The present disclosure is described with reference to flowcharts and/or a block diagrams of a method, a device (system), and a computer program product according to the embodiments of the present disclosure. Each flow and/or block of the flowcharts and/or block diagrams, and a combination of the flow and/or block of the flowcharts and/or block diagrams may be implemented by computer program instructions. The computer program instructions may be provided to a processor of a general-purpose computer, special-purpose computer, embedded processor, or other programmable data processing device to produce a machine, so that the device can be produced for implementing the functions determined by one or more flows of the flowcharts and/or one or more blocks of the block diagrams through the instructions executed by the processors of the computer or other programmable data processing equipment.

The computer program instructions may also be stored in computer-readable memory, which can direct the computer or other programmable data processing equipment to work in a particular manner, so that the instructions stored in the computer-readable memory produce a manufacturing product including an instruction device. The instructions implement the functions determined by one or more flows of the flowcharts and/or one or more blocks of the block diagram.

The computer instructions may also be loaded on the computer or other programmable data processing equipment, so that a series of operation processes are executed on the computer or other programmable data processing equipment to produce a computer-implemented process. Therefore, the instructions executed on the computer or other programmable data processing equipment provide the process to implement the functions determined by one or more flows of the flowchart and/or one or more blocks of the block diagrams.

The above descriptions are merely some preferred embodiments of the present disclosure and are not used to limit the scope of the present disclosure.

What is claimed is:

1. An electronic apparatus, comprising:
   a display screen, which includes a display output section;
   a fingerprint collection device, configured under the display screen of the fingerprint collection device, wherein the fingerprint collection device includes a fingerprint collection section, which corresponds to the display output section and is smaller than or equal to the display output section;
   a processor, configured to:

obtain a historical effective section for fingerprint collection, wherein the historical effective section is a partial section of a fingerprint collection section;

determine a target effective section for performing a fingerprint collection operation based on the historical effective section, wherein the target effective section and the historical effective section are different; and generate an indication based on the target effective section, displayed at a target display section of the display output section, and the target effective section corresponding to the target display section.

2. The electronic apparatus of claim 1, wherein:
the fingerprint collection device includes an image collection component;
the processor is configured to obtain the historical effective section for the fingerprint collection including at least one of:
to obtain a section, when a previous fingerprint is verified, through a touch sensing function of the display screen;
to obtain the corresponding target display section when the previous fingerprint is verified; or
to obtain a section corresponding to the image collection component executing the fingerprint collection operation of the fingerprint collection device when the previous fingerprint is verified.

3. The electronic apparatus of claim 1, wherein:
the processor is configured to determine a first historical effective section of the historical effective section, and move the first historical effective section along a first direction with a first distance or along a second direction with a second distance to obtain the target effective section; and
the indication is used to indicate a center position of the target effective section or a boundary position of the target effective section.

4. The electronic apparatus of claim 1, wherein the processor is further configured to:
obtain historical fingerprint information collected from the historical effective section;
obtain target fingerprint information collected from the target effective section; and
perform unlocking processing based on the target fingerprint information, in response to the target fingerprint information and the historical fingerprint information being different.

5. The electronic apparatus of claim 1, wherein:
the historical fingerprint information and the target fingerprint information include fingerprint textures, fingerprint orientations, and numbers of fingerprints; and
the target fingerprint information and the historical fingerprint information being different includes that at least one of the fingerprint textures, the fingerprint orientations, or the number of fingerprints of the target fingerprint information being different from one of those of the historical fingerprint information.

6. The electronic apparatus of claim 1, the processor being further configured to obtain historical fingerprint information collected from the historical effective section, wherein:
the historical fingerprint information includes a first fingerprint number;
a second fingerprint number of the target effective section is determined based on the first fingerprint number of the historical effective section, wherein the first fingerprint number and the second fingerprint number are different; and an indication is generated based on the second fingerprint number, indicating a number of fingers to provide to the fingerprint collection operation.

7. The electronic apparatus of claim 1, the processer being further configured to obtain historical fingerprint information collected from the historical effective section, wherein:
the historical fingerprint information includes an object of the first fingerprint;
an object of the second fingerprint of the target effective section is determined based on the object of the first fingerprint of the historical effective section, wherein the object of the first fingerprint and the object of the second fingerprint are different; and
an indication is generated based on the object of the second fingerprint, indicating specific fingers to provide to the fingerprint collection operation.

8. A non-transitory computer-readable storage medium storing a computer program that, when executed by a processor of an electronic apparatus, causes the electronic apparatus to perform a method of fingerprint collection, the method comprising:
obtaining a historical effective section for fingerprint collection, wherein the historical effective section is a partial section of a fingerprint collection section, the fingerprint collection section corresponds to a display output section of a display screen, and the fingerprint collection section is smaller than or equal to the display output section;
determining a target effective section for performing a fingerprint collection operation based on the historical effective section, wherein the target effective section and the historical effective section are different; and
generating an indication based on the target effective section displayed at a target display section of the display output section, and the target effective section corresponding to the target display section.

9. The non-transitory computer-readable storage medium of claim 8, wherein obtaining the historical effective section for the fingerprint collection includes:
obtaining a fingerprint input section determined by a touch sensing function of the display screen when a previous fingerprint is verified;
obtaining a corresponding target display section corresponding to when the previous fingerprint is verified; and
obtaining a section corresponding to an image collection component executing the fingerprint collection of a fingerprint collection device when the previous fingerprint is verified.

10. The non-transitory computer-readable storage medium of claim 8, wherein determining the target effective section for performing the fingerprint collection operation based on the historical effective section includes:
determining a first historical effective section based on the historical effective section; and
moving the first historical effective section along a first direction with a first distance, or along a second direction with a second distance to obtain the target effective section.

11. The non-transitory computer-readable storage medium of claim 8, wherein the indication is used to indicate a center position of the target effective section or a boundary position of the target effective section.

12. The non-transitory computer-readable storage medium of claim 8, wherein after the indication is generated based on the target effective section, the method further comprising:

obtaining historical fingerprint information collected from the historical effective section;

obtaining target fingerprint information collected from the target effective section; and in response to the target fingerprint information and the historical fingerprint information being different, performing unlock processing based on the target fingerprint information.

13. A fingerprint collection method, comprising:

obtaining a historical effective section for fingerprint collection, wherein the historical effective section is a partial section of a fingerprint collection section, the fingerprint collection section corresponds to a display output section of a display screen, and the fingerprint collection section is smaller than or equal to the display output section;

determining a target effective section for performing a fingerprint collection operation based on the historical effective section, wherein the target effective section and the historical effective section are different; and generating an indication based on the target effective section displayed at a target display section of the display output section, and the target effective section corresponding to the target display section.

14. The method of claim 13, wherein obtaining the historical effective section for the fingerprint collection includes:

obtaining a fingerprint input section determined by a touch sensing function of the display screen when a previous fingerprint is verified;

obtaining a corresponding target display section corresponding to when the previous fingerprint is verified; and obtaining a section corresponding to an image collection component executing the fingerprint collection of a fingerprint collection device when the previous fingerprint is verified.

15. The method of claim 13, wherein determining the target effective section for performing the fingerprint collection operation based on the historical effective section includes:

determining a first historical effective section based on the historical effective section; and moving the first historical effective section along a first direction with a first distance, or along a second direction with a second distance to obtain the target effective section.

16. The method of claim 13, wherein the indication is used to indicate a center position of the target effective section or a boundary position of the target effective section.

17. The method of claim 13, wherein after the indication is generated based on the target effective section, the method further comprising:

obtaining historical fingerprint information collected from the historical effective section;

obtaining target fingerprint information collected from the target effective section; and in response to the target fingerprint information and the historical fingerprint information being different, performing unlock processing based on the target fingerprint information.

18. The method of claim 17, wherein:

the historical fingerprint information and the target fingerprint information include fingerprint textures, fingerprint orientations, and numbers of fingerprints; and the target fingerprint information and the historical fingerprint information being different includes that at least one of the fingerprint textures, the fingerprint orientations, or the number of fingerprints of the target fingerprint information being different from one of those of the historical fingerprint information.

19. The method of claim 13, further comprising:

obtaining historical fingerprint information collected from the historical effective section, wherein the historical fingerprint information includes a first fingerprint number;

determining a second fingerprint number of the target effective section based on the first fingerprint number of the historical effective section, wherein the first fingerprint number and the second fingerprint number are different; and generating an indication based on the second fingerprint number, indicating a number of fingers to provide to the fingerprint collection operation.

20. The method of claim 13, further comprising:

obtaining historical fingerprint information collected from the historical effective section, wherein the historical fingerprint information includes an object of the first fingerprint;

determining an object of the second fingerprint of the target effective section based on the object of the first fingerprint of the historical effective section, wherein the object of the first fingerprint and the object of the second fingerprint are different; and generating an indication based on the object of the second fingerprint, indicating specific fingers to provide to the fingerprint collection operation.

* * * * *